United States Patent [19]
Edwards

[11] Patent Number: 5,813,792
[45] Date of Patent: Sep. 29, 1998

[54] COUPLING DEVICE

[76] Inventor: John W. Edwards, P.O. Box 2350, Arcadia, Fla. 34265

[21] Appl. No.: 748,565

[22] Filed: Nov. 13, 1996

[51] Int. Cl.$^6$ ........................................................ F16B 2/02
[52] U.S. Cl. .............................. 403/322; 403/26; 56/15.2; 56/DIG. 14
[58] Field of Search ..................... 56/15.1, 15.2, 56/15.5, DIG. 11, DIG. 14; 403/322, 321, 24, 31, 26, 324

[56] References Cited

U.S. PATENT DOCUMENTS

| 3,021,658 | 2/1962 | Mitchell | 56/15.1 |
|---|---|---|---|
| 4,873,818 | 10/1989 | Turner | 56/15.5 X |
| 4,878,713 | 11/1989 | Zanetis | 404/90 X |
| 4,905,466 | 3/1990 | Heppner | 56/15.1 X |
| 5,105,609 | 4/1992 | Covington et al. | 56/15.5 X |
| 5,310,275 | 5/1994 | Lovitt | 403/322 |
| 5,313,772 | 5/1994 | Tonutti | 56/DIG. 14 X |

FOREIGN PATENT DOCUMENTS

| 2608362 | 6/1988 | France | 56/15.5 |
|---|---|---|---|
| 1586589 | 8/1990 | U.S.S.R. | 56/15.2 |

*Primary Examiner*—Harry C. Kim
*Attorney, Agent, or Firm*—Frijouf, Rust & Pyle, P.A.

[57] ABSTRACT

An improved coupling device is disclosed for coupling a tool to a vehicle. The improved coupling device comprises a coupling member secured to a first and a second arm of the vehicle. A first and a second bearing is secured to the coupling member for slidably supporting a first and a second shaft. A connector member is secured to the first and second shafts for mounting to the tool. An actuator drives the connector member relative to the coupling member on the first and second shafts for adjusting the position of the tool relative to the vehicle.

18 Claims, 9 Drawing Sheets

COUPLING DEVICE

BACKGROUND OF THE INVENTION

FIELD OF THE INVENTION

This invention relates to coupling devices and more particularly to an improved coupling device for coupling a tool to a vehicle capable of adjusting the lateral position of the tool relative to the vehicle.

BACKGROUND OF THE INVENTION

The prior art has known various types of couplings for coupling a tool to a vehicle. For example, a land vehicle such as a tractor may be provided with a tool such as a cutting tool for cutting vegetation, plants, crops or the like. Typically, the coupling positions the tool on the front or on the rear of the vehicle.

One specific example of a cutting tool on a vehicle includes a tractor supporting a rotary cutting tool on an arm pivotably mounted to the tractor. The coupling is capable of controlling the elevational and angular position of the cutting tool relative to the tractor. Although the couplings of the prior art were able to control the elevational and angularly position the tool relative to the tractor, the couplings of the prior art were incapable of controlling the lateral position of the tool relative to the tractor.

One example of a tool for the vehicle is a power mower head for cutting heavy vegetation such as shrubs, small trees and the like. Typically, the power mower head extend between one-half and two-thirds the width of the vehicle. Accordingly, the areas immediately in front of the wheels of the vehicle are not cut by the power mower head. In some instances, it is desirable to cut immediately in front of the wheels of the vehicle. For example, it is desirable to cut immediately in front of the front wheel of the vehicle when the power mover head is cutting vegetation adjacent to a vertical wall or other type of vertical structure and the vehicle is moving parallel to the vertical wall or other type of vertical structure.

Therefore, it is an object of the present invention to provide an improved coupling for coupling a tool to a vehicle for enabling the lateral movement of the tool relative to the vehicle.

Another object of this invention is to provide an improved coupling for coupling a tool to a vehicle which is capable of laterally moving the tool to be positioned in line with a side of the vehicle.

Another object of this invention is to provide an improved coupling for coupling a tool to a vehicle which is capable of laterally moving the tool to be positioned in front of or beyond a front wheel of the vehicle.

Another object of this invention is to provide an improved coupling for coupling a tool to a vehicle which is capable of laterally moving the tool to cut around obstructions such as trees, hedges and the like.

Another object of this invention is to provide an improved coupling for coupling a tool to a vehicle which is power operated by hydraulic power.

Another object of this invention is to provide an improved coupling for coupling a tool to a vehicle which may be fitted to existing vehicles.

Another object of this invention is to provide an improved coupling for coupling a tool to a vehicle which enables the tool to be readably interchanged with other tools.

Another object of this invention is to provide an improved coupling for coupling a tool to a vehicle which is inexpensive to install and maintain.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved coupling device for coupling a tool to a vehicle. The vehicle has a first arm extending from the vehicle for carrying the tool. The vehicle has a second arm extending from the vehicle for orienting the position of the tool relative to the first arm. The improved coupling device comprises a coupling member secured to the first and second arms. A first and a second bearing is secured to the coupling member. A first and a second shaft is slidably mounted in the first and second bearings. A connector member is secured to the first and second shafts for mounting to the tool. An actuator moves the connector member relative to the coupling member on the first and second shafts for adjusting the position of the tool relative to the vehicle.

In a more specific embodiment of the invention, the vehicle is a land vehicle and the tool is a rotary powered tool. Preferably, the first and second arms pivotably extend from the vehicle. The coupling member comprises a longitudinally extending plate with a first and a second pivot pivotably securing the coupling member to the first and second arms.

In one embodiment of the invention, each of the first and second arms comprises a pair of arms. Preferably, the first and second shafts are substantially parallel with the actuator moving the connector member in a direction parallel to a longitudinal axis extending through one of the first and second shafts.

In another embodiment of the invention, the connector member comprises a pair of connector members secured to opposed ends of the first and second shafts. The actuator is a hydraulic actuator coacting between the coupling member and the connector member for moving the connector member on the first and second shafts relative to the coupling member.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
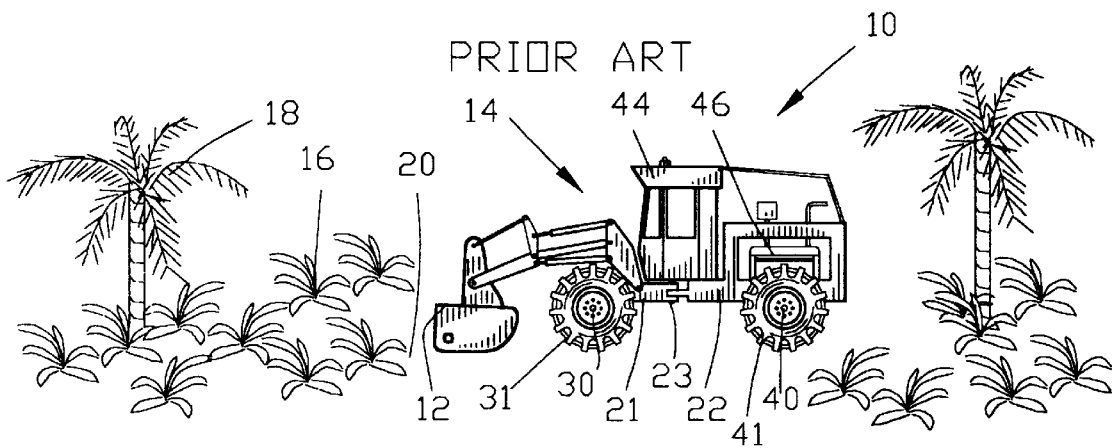
FIG. 1 is a side elevational view of a vehicle supporting a tool for cutting vegetation such as heavy brush and small trees.

FIG. 1 is a side elevational view of a vehicle 10 for supporting a tool 12. The vehicle 10 is shown as a land vehicle but it should be understood that the present invention may be utilized on various types of vehicles such as railed vehicles and/or sea going vehicles such as barges and the like. The rotary cutting tool 12 is supported by the vehicle 10 through a conventional coupling 14 well known in the prior art. The tool 12 is shown as a rotary cutting tool for cutting vegetation such as heavy brush 16 and small trees 18 growing from a ground surface 20.

Figure 2:
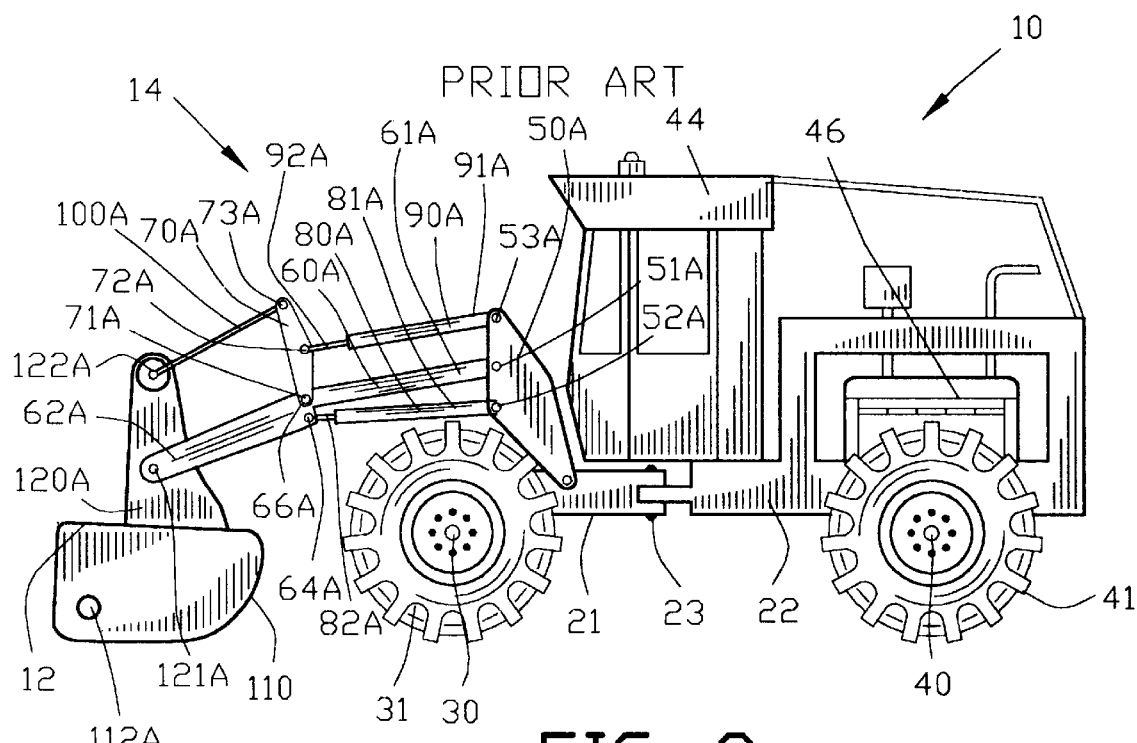
FIG. 2 is an enlarged side elevational view of the vehicle of FIG. 1 supporting the tool with a conventional prior art coupling.
Figure 3:
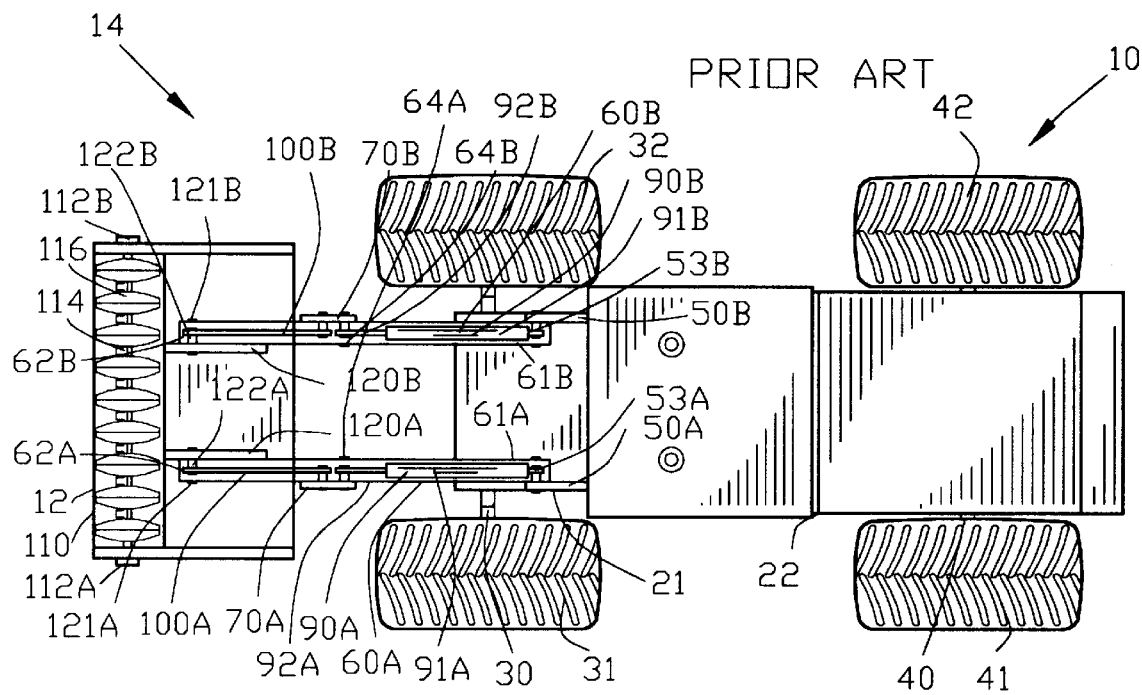
FIG. 3 is a top view of FIG. 2.
Figure 4:
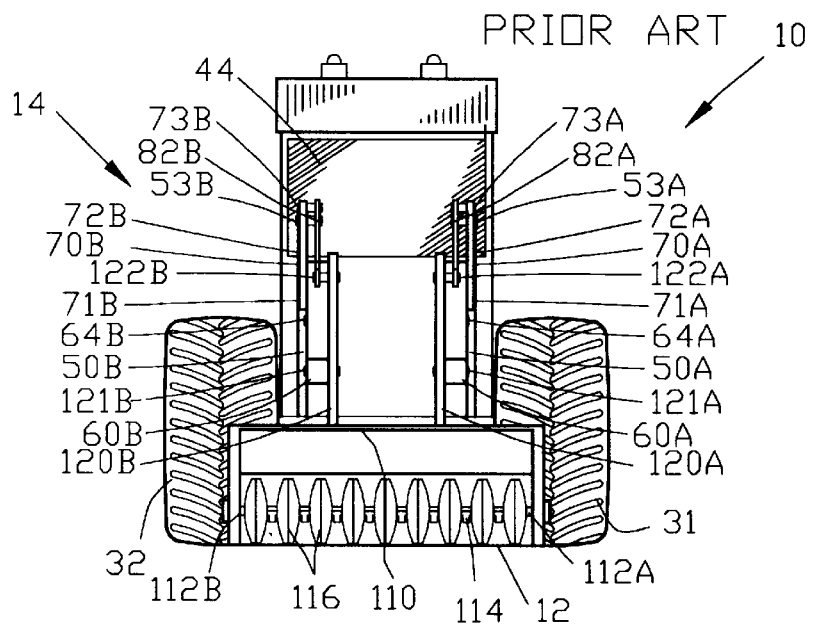
FIG. 4 is a front elevational view of FIG. 2.

FIG. 2 is an enlarged side elevational view of the vehicle 10 of FIG. 1 with FIGS. 3 and 4 being top and front views thereof. The vehicle 10 is shown as a tractor of conventional design comprising a front portion 21 and a rear portion 22 interconnected by a pivot 23. The front portion 21 of the vehicle 10 includes a front axle 30 for rotatably mounting front wheels 31 and 32. The rear portion 22 of the vehicle 10 includes a rear axle 40 for rotatably mounting rear wheels 41 and 42. The pivot 23 is located proximate to the center of the vehicle 12 with a control cab 44 being disposed above the pivot 23. An engine 46 powers the vehicle in a conventional manner as should be well known by those skilled in the art. The vehicle 12 is steered by angling the front portion 21 of the vehicle 12 relative to the rear portion 22 about the pivot 23. The angling of the front portion 21 relative to the rear portion 22 about the pivot 23 is typically accomplished by hydraulic actuators (not shown).

The vehicle 12 includes plural supports 50A and 50B secured to the first portion 21 of the vehicle 12. The plural supports 50A and 50B includes plural first pivots 51A and 51B, plural second pivots 52A and 52B and plural third pivots 53A and 53B. Plural arms 60A and 60B pivotably extend from the front portion 21 of the vehicle 10.

The arm 60A defines a proximal end 61A and a distal end 62A with the proximal end 61A being pivotably mounted to the first pivot 51A of the support 50A. The arm 60A supports pivots 64A and 66A located between the proximal end 61A and the distal end 62A of the arm 60A.

In a similar manner, the arm 60B defines a proximal end 61B and a distal end 62B with the proximal end 61B being pivotably mounted to the first pivot 51B of the support 50B. The arm 60B supports pivots 64B and 66B located between the proximal end 61B and the distal end 62B of the arm 60B.

Plural bell cranks 70A and 70B are pivotably secured to the plural arms 60A and 60B. The bell crank 70A includes a first pivot 71A, a second pivot 72A and a third pivot 73A. The first pivot 71A of the bell crank 70A is secured to the pivot 66A located on the arm 60A. The bell crank 70B includes a first pivot 71B, a second pivot 72B and a third pivot 73B. The first pivot 71B of the bell crank 70B is secured to the pivot 66B located on the arm 60B.

Plural first hydraulic actuators 80A and 80B extend between the plural supports 50A and 50B and the plural arms 60A and 60B. The first hydraulic actuator 80A comprises a cylinder 81A and a shaft 82A with the shaft 82A being secured to a piston (not shown) disposed within the cylinder 81A. The cylinder 81A is secured to the second pivot 52A. The shaft 82A is pivotably mounted to a pivot 64A disposed on the arm 60A.

The first hydraulic actuator 80B comprises a cylinder 81B and a shaft 82B with the shaft 82B being secured to a piston (not shown) disposed within the cylinder 81B. The cylinder 81B is secured to the second pivot 52B. The shaft 82B is pivotably mounted to a pivot 64B disposed on the arm 60B.

Plural second hydraulic actuators 90A and 90B extend between the plural supports 50A and 50B and the plural bell cranks 70A and 70B. The second hydraulic actuator 90A comprises a cylinder 91A and a shaft 92A with the shaft 92A being secured to a piston (not shown) disposed within the cylinder 91A. The cylinder 91A is pivotably secured to the third pivot 53A. The shaft 92A of the second hydraulic actuator 90A is pivotably secured to the second pivot 72A of the bell crank 70A.

The second hydraulic actuator 90B comprises a cylinder 91B and a shaft 92B with the shaft 92B being secured to a piston (not shown) disposed within the cylinder 91B. The cylinder 91B is pivotably secured to the third pivot 53B. The shaft 92B of the second hydraulic actuator 90B is pivotably secured to the second pivot 72B of the bell crank 70B.

Plural second arms 100A and 100B extends between the plural bell cranks 70A and 70B and the rotary cutting tool 12. The second arms 100A and 100B are pivotably secured to the third pivots 73A and 73B of the bell cranks 70A and 70B.

The rotary cutting tool 12 comprises a housing 110 having journal 112A and 112B for rotatably mounting a shaft 114. The shaft 114 supports a plurality of cutting tools 116 mounted along the longitudinal length and about the circumference of the shaft 114. The plurality of cutting tools 116 of the rotary cutting tool 12 are shown as vegetation cutters for heavy mowing operations such as the clearing of heavy brush and trees up to a diameter of approximately 6 inches in trunk diameter.

The rotary cutting tool 12 includes plural mountings 120A and 120B secured to the housing 110 of the rotary cutting tool 12. The plural mountings 120A and 120B includes plural pivots 121A and 121B and plural pivots 122A and 122B. The second arms 100A and 100B are pivotably secured to the plural pivot 122A and 122B of the plural mountings 120A and 120B.

Figure 5:
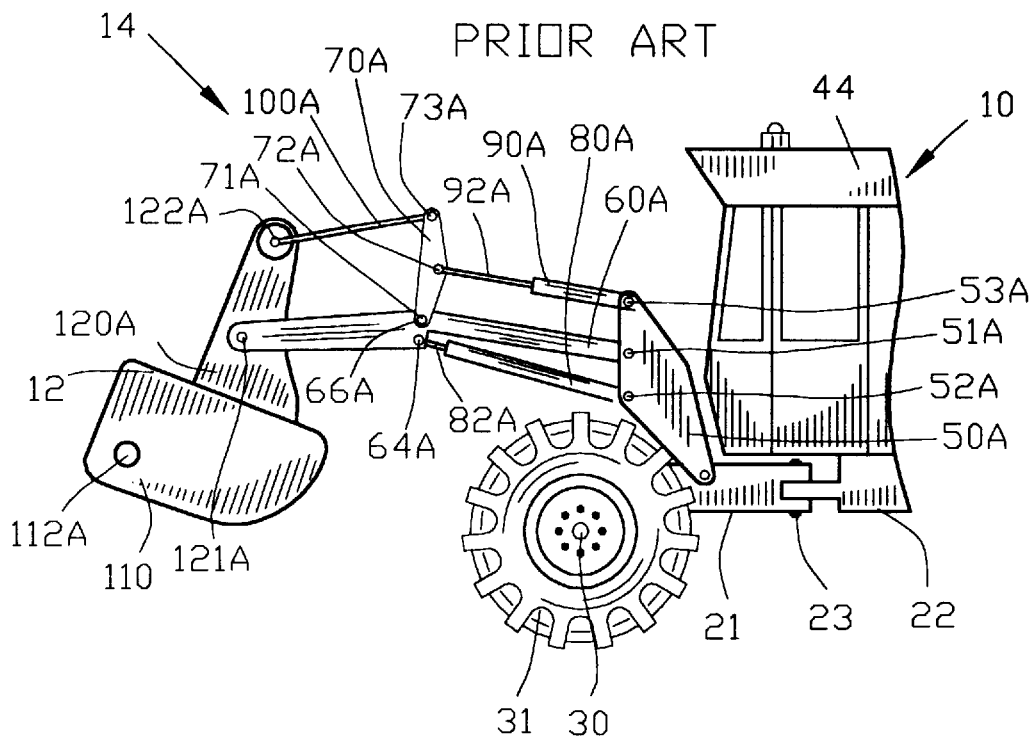
FIG. 5 is a partial side elevational view of the vehicle of FIG. 2 illustrating the elevation of the cutting tool relative to the vehicle.
Figure 6:
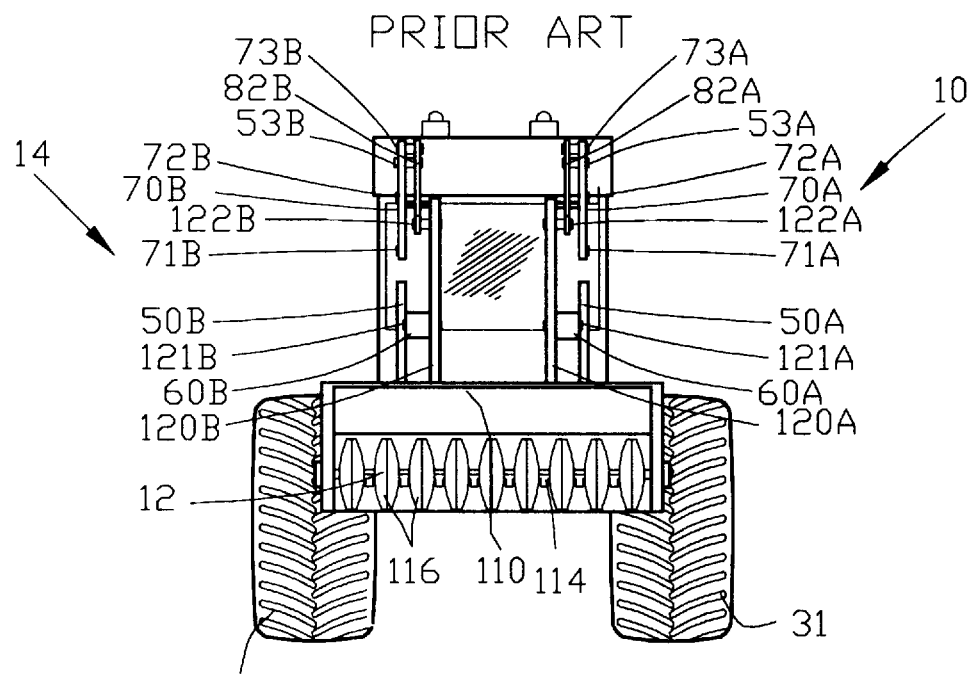
FIG. 6 is a front elevational view of FIG. 5.

FIG. 5 is a partial side elevational view of the vehicle 10 of FIG. 2 illustrating the elevation of the cutting tool 12 relative to the vehicle 10. FIG. 6 is a front elevational view of FIG. 5. The elevation of the cutting tool 12 relative to the vehicle 10 is caused upon actuation of the plural first hydraulic actuators 80A and 80B. The plural arms 60A and 60B are rotated about the plural first pivots 51A and 51B for raising the tool 12 relative to the ground surface 20.

Figure 7:
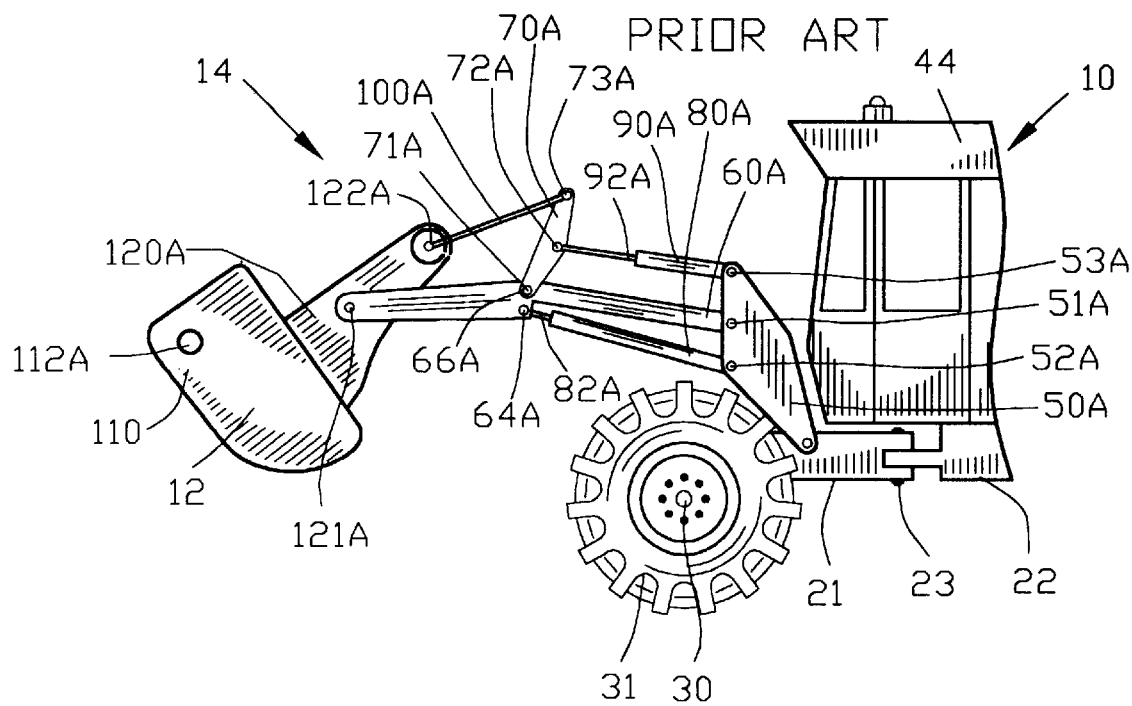
FIG. 7 is a partial side elevational view of the vehicle of FIG. 1 illustrating the angular positioning of the cutting tool relative to the vehicle.
Figure 8:
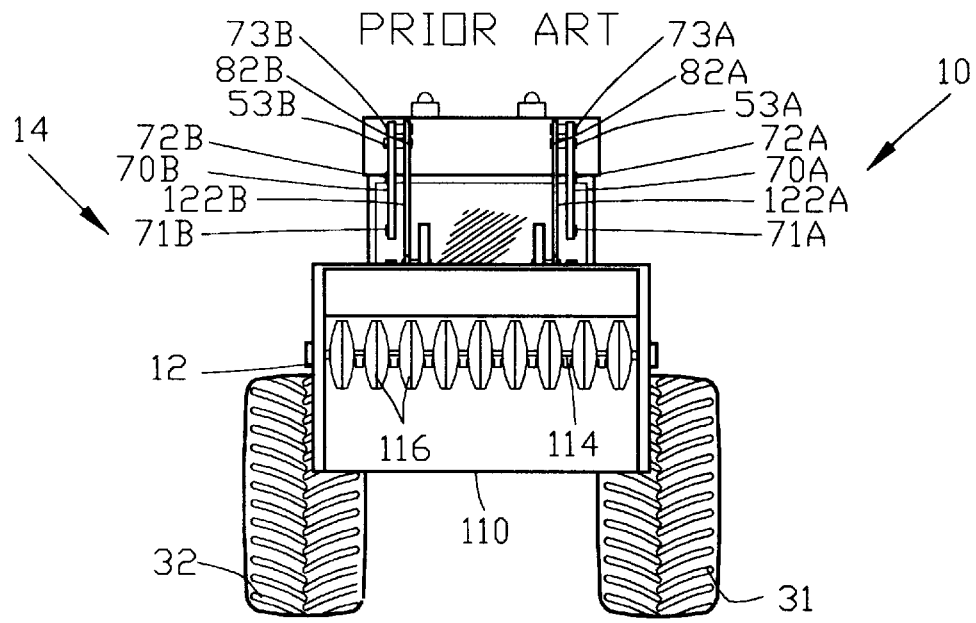
FIG. 8 is a front elevational view of FIG. 7.

FIG. 7 is a partial side elevational view of the vehicle 10 of FIG. 1 illustrating the angular positioning of the cutting tool 12 relative to the vehicle 10. FIG. 8 is a front elevational view of FIG. 7. The rotation of the tool 12 on the plural pivots 121A and 121B is caused upon actuation of the plural second hydraulic actuators 90A and 90B. The actuation of the plural second hydraulic actuators 90A and 90B rotate the plural bell cranks 70A and 70B about the plural first pivots 71A and 71B for longitudinally moving the plural second arms 100A and 100B pivotably connected to the plural pivots 122A and 122B for rotating the tool 12 as shown. As should be well known in the art, the movements of the plural first hydraulic actuators 80A and 80B are independent of movements of the plural second hydraulic actuators 90A and 90B. The independent movements of the plural first hydraulic actuators 80A and 80B and the plural second hydraulic actuators 90A and 90B can be used to position the tool 12 in various angular and elevational positions.

As can be seen in FIGS. 3, 4, 6 and 7, the tool 12 has a width which is less than the width between the outside surfaces of the wheels 31 and 32. Accordingly, the tool 12 is incapable of cutting an area in front of either of the wheels 31 or 32. Although the tool 12 may be positioned elevationally as shown in FIGS. 5 and 6 and may be positioned in angularly as shown in FIGS. 7 and 8, the tool 12 cannot be laterally moved relative to the vehicle 10.

Figure 9:
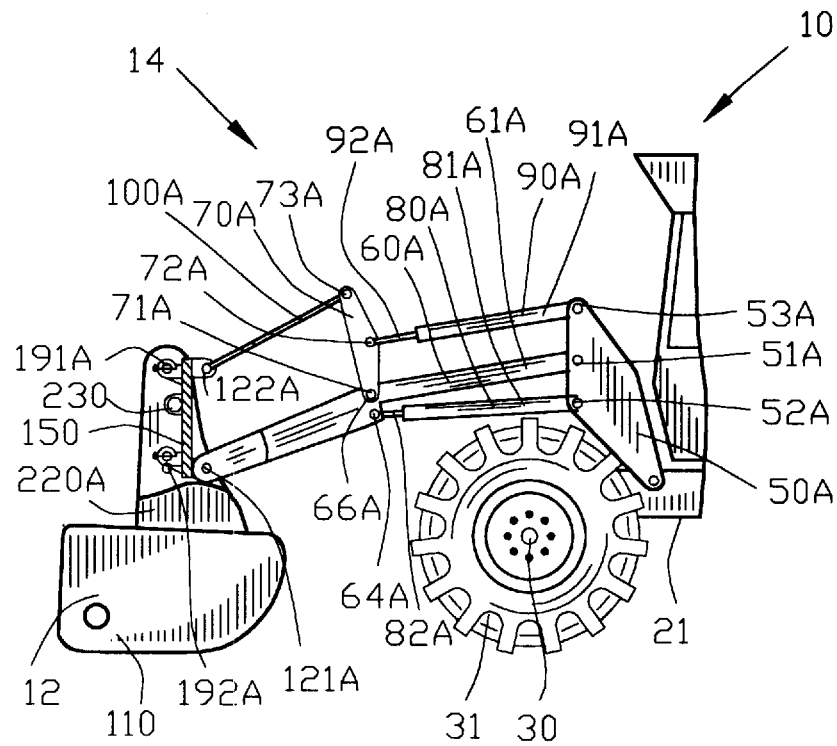
FIG. 9 is a side elevational view similar to FIG. 2 with the vehicle supporting the tool with an improved coupling device of the present invention.
Figure 10:
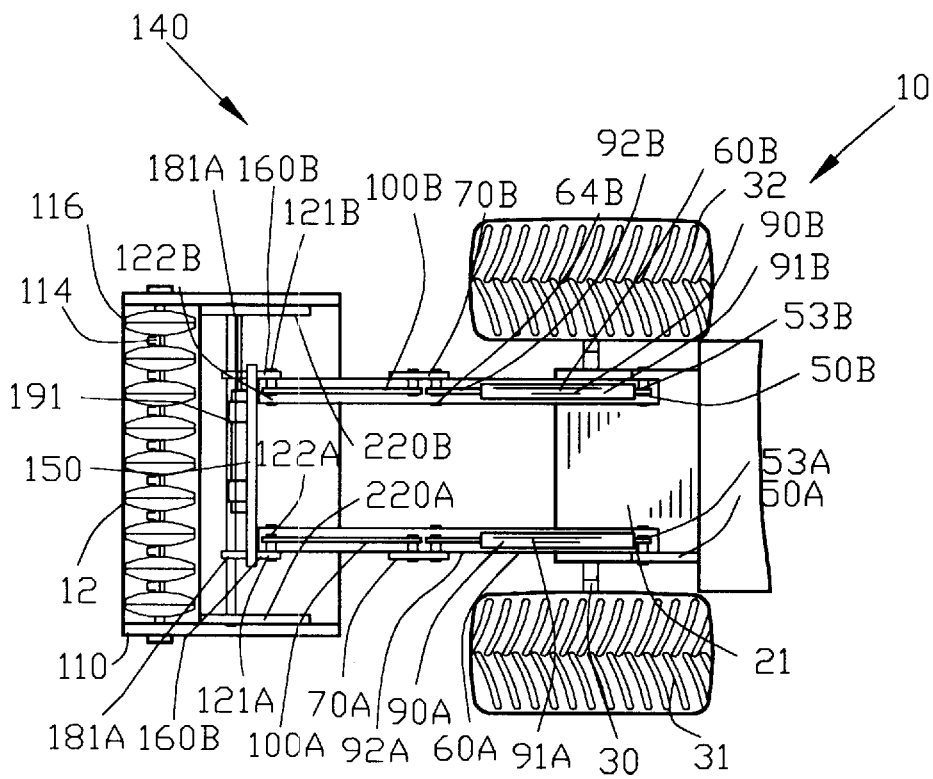
FIG. 10 is a top view of FIG. 9.

FIGS. 9 and 10 are enlarged side and top views of a coupling device 140 of the present invention for coupling the tool to the vehicle 10. The coupling device 140 comprises a coupling member 150 pivotably secured to the first arms 60A and 60B and the second arms 100A and 100B. As will be described in greater detail hereinafter, the tool 12 is slidably mounted to the coupling member 150 for laterally moving the tool 12 relative to the vehicle 10.

Figure 11:
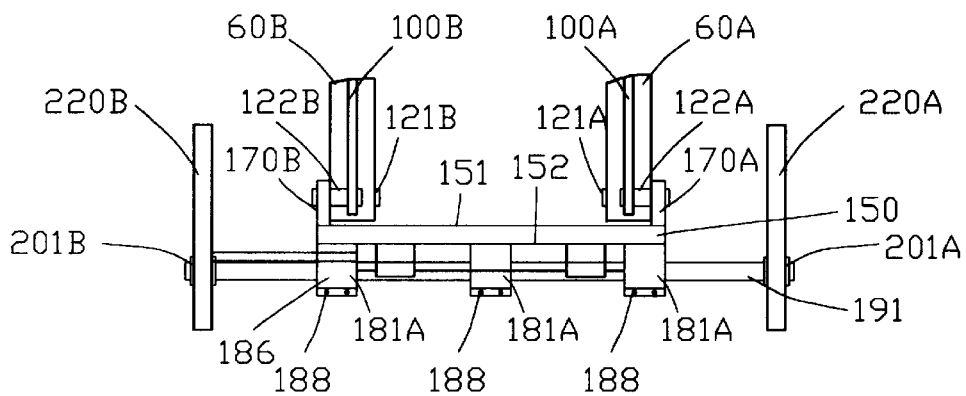
FIG. 11 is an enlarged rotated top view of the improved coupling device of FIG. 10.
Figure 12:
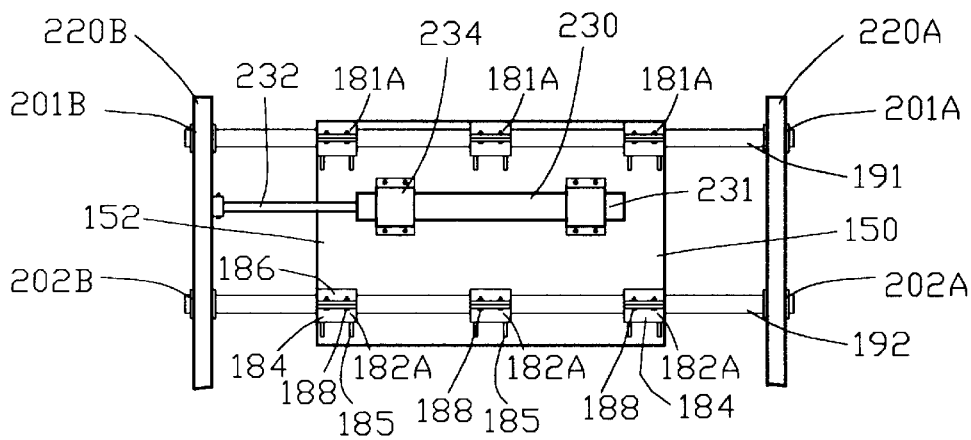
FIG. 12 is a front elevational view of FIG. 11.

FIG. 11 is an enlarged rotated top view of the coupling device 140 of FIG. 10 with FIG. 12 being a front elevational view of FIG. 11. The coupling member 150 comprises a longitudinally extending plate defining a first and a second side 151 and 152. Plural pivots 160A and 160B are secured to the first side 151 of the coupling member 150. The plural pivots 160A and 160B are pivotably secured to the first arms 60A and 60B. Plural pivots 170A and 170B are secured to the first side 151 of the coupling member 150. The plural pivots 170A and 170B are pivotably secured to the second arms 100A and 100B.

In a manner similar to the prior art, the coupling member 150 may be elevated relative to the vehicle 10 upon actuation of the plural first hydraulic actuators 80A and 80B to rotate the arms 60A and 60B about the plural first pivots 51A and 51B. In addition, the coupling member 150 may be angularly positioned relative to the vehicle 10 upon actuation of the plural second hydraulic actuators 90A and 90B.

A first plurality of bearing 181A, 181B and 181C are secured to the second side 152 of the coupling member 150. A second plurality of bearing 182A, 182B and 182C are secured to the second side 152 of the coupling member 150. A first shaft 191 is slidably mounted in the first plurality of bearing 181A, 181B and 181C for lateral movement relative to the coupling member 150. A second shaft 192 is slidably mounted in the second plurality of bearing 182A, 182B and 182C for lateral movement relative to the coupling member 150. The first and second shafts 191 and 192 are disposed substantially parallel to one another.

The terminal ends of the first and second shafts 191 and 192 are connected through first bushings 201A and 201B and second bushing 202A and 202B to plural connector members 220A and 220B. The plural connector members 220A and 220B are connected to the housing 110 of the tool 12.

A third hydraulic actuator 230 extend between the coupling member 150 and the connector member 220B. The third hydraulic actuator 230 comprises a cylinder 231 and a shaft 232 with the shaft 232 being secured to a piston (not shown) disposed within the cylinder 231. The cylinder 232 is secured to the coupling member 150 by mountings 234. The shaft 232 is mounted to the connector member 220B. Upon actuation of the third hydraulic actuator 230, the shaft 232 moves relative to the cylinder 231 to move the connector member 220B relative to the coupling member 150. The actuation of the third hydraulic actuator 230 laterally moves the tool 12 in a direction parallel to a longitudinal axis extending through one of the first and second shafts 191 and 192 relative to the vehicle 10.

Figures 13, 14, 15:
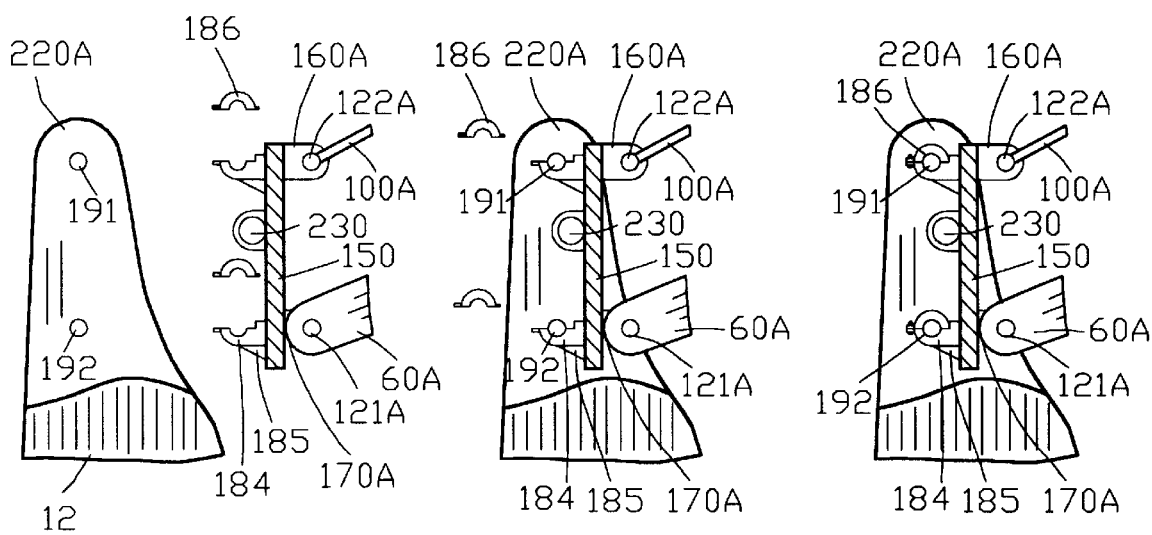
FIG. 13 is a partial side elevational view of FIG. 12 illustrating the improved coupling device being positioned adjacent to the cutting tool.
FIG. 14 is a side view similar to FIG. 13 illustrating the improved coupling device engaging with the cutting tool.
FIG. 15 a side view similar to FIG. 14 illustrating the improved coupling device secured to the cutting tool.

FIG. 13 is a partial side elevational view of FIG. 12 illustrating the coupling device 140 being positioned adjacent to the tool 12. Each of the first plurality of bearings 181A–181C and each of the second plurality of bearings 182A–182C comprises a base portion 184 having supports 185 for securing the base portion 184 to the coupling member 150. Each of the first plurality of bearings 181A–181C and each of the second plurality of bearings 182A–182C comprises a removable portion 186 which is securable to the base portion 184 by plural fasteners 188 shown as bolts and nuts. The removable portion 186 is shown separated from the base portion 184 for enabling the coupling member 150 to be positioned to receive the first and second shafts 191 and 192 within the first plurality of bearings 181A–181C and the second plurality of bearings 182A–182C.

FIG. 14 is a side view similar to FIG. 13 illustrating the coupling device 140 engaging with the tool 12. The removable portion 186 is shown with the base portion 184 receiving the first and second shafts 191 and 192 within the first plurality of bearings 181A–181C and the second plurality of bearings 182A–182C.

FIG. 15 is a side view similar to FIG. 14 illustrating the coupling device 140 secured to the tool 12. The removable portion 186 is shown secured to the base portion 184 by the plural fasteners 188 for slidably enclosing the first and second shafts 191 and 192 within the first plurality of bearings 181A–181C and the second plurality of bearings 182A–182C. The base portion 184 and the removable portion 186 enables the tool 12 to be readably interchanged with another tool.

Figure 16:
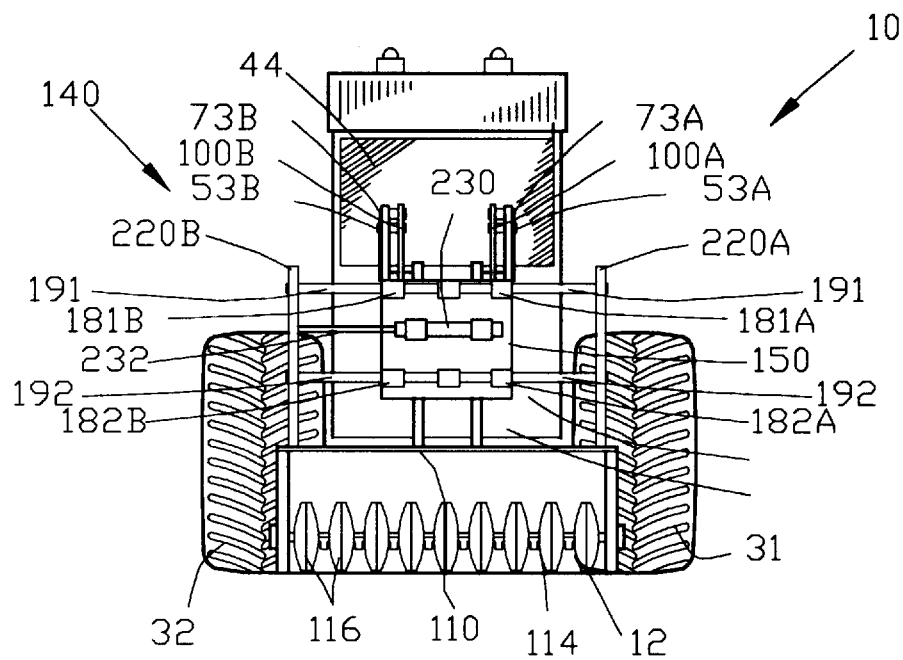
FIG. 16 is a front elevational view of FIG. 9 illustrating the tool in a central position.
Figure 17:
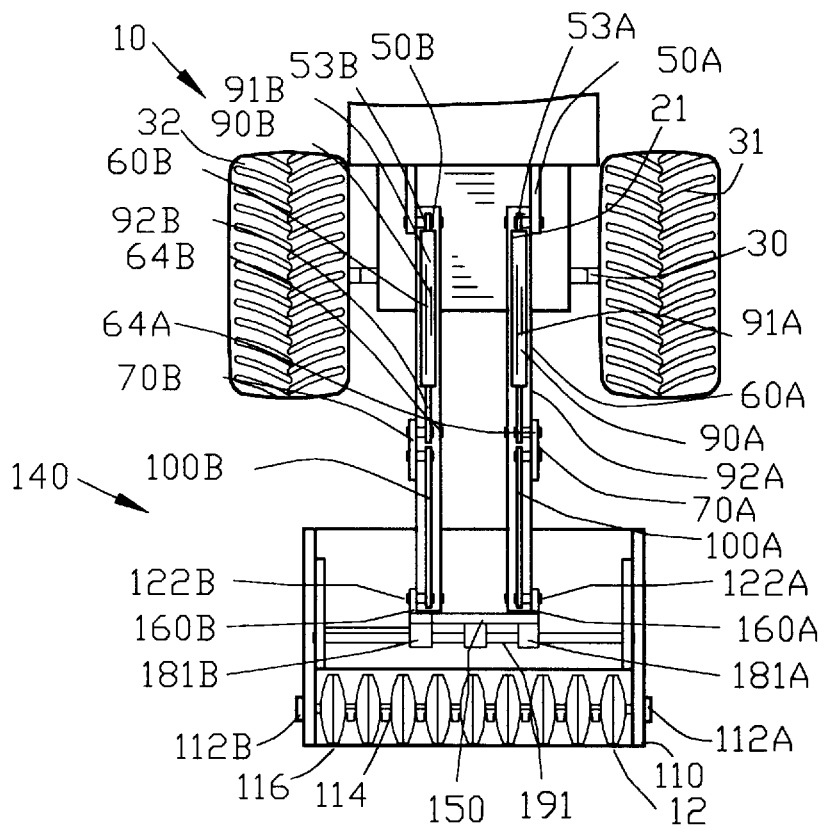
FIG. 17 is a top view of FIG. 16.

FIG. 16 is a front elevational view of FIG. 9 illustrating the tool 12 in a central position. FIG. 17 is a top view of FIG. 16. The tool 12 is positioned in the same position as the tool of the prior art coupling 14 shown in FIGS. 1–8. Since the tool 12 extends approximately two-thirds the width of the vehicle, the areas immediately in front of the wheels 31 and 32 of the vehicle 12 are not cut by the tool 12.

Figure 18:
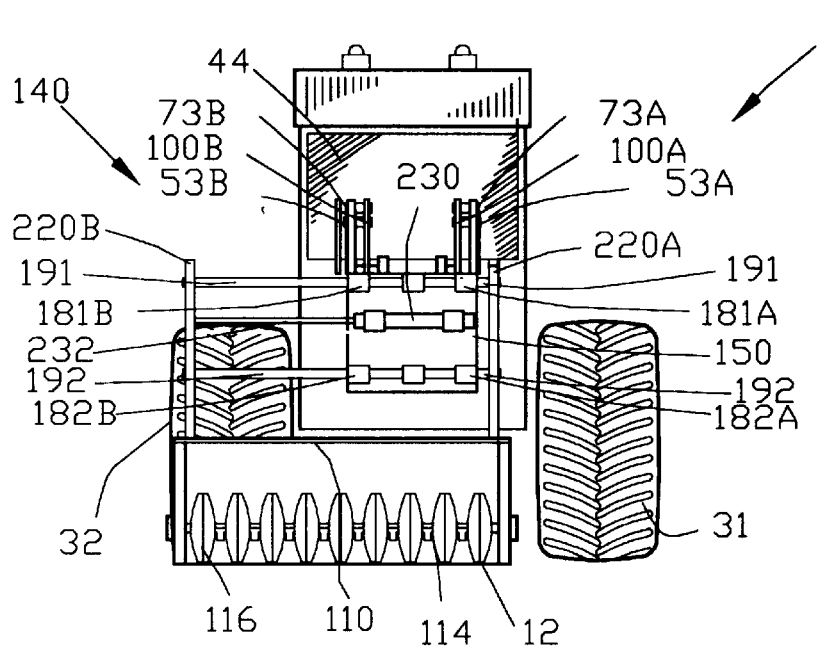
FIG. 18 is a front elevational view of FIG. 9 illustrating the tool in a first lateral position.
Figure 19:
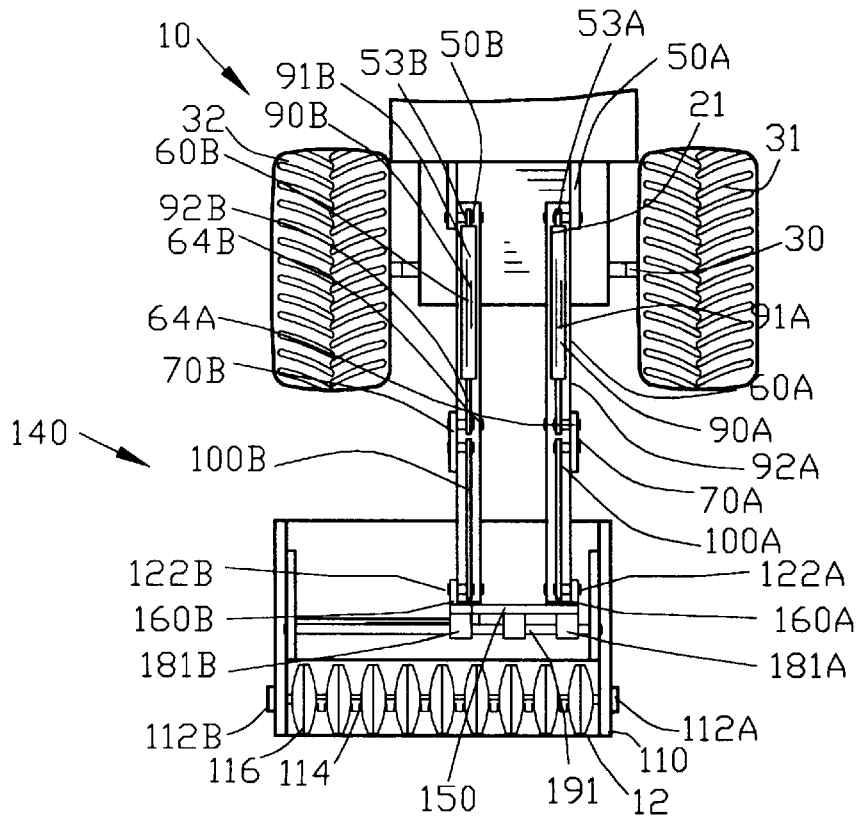
FIG. 19 is a top view of FIG. 18.

FIG. 18 is a front elevational view of FIG. 9 illustrating the tool 12 in a first lateral position with FIG. 19 being a top view of FIG. 18. When it is desired to cut vegetation immediately in front of the wheel 32 of the vehicle 10, the third hydraulic actuator 230 is actuated to extend the shaft 232 relative to the cylinder 231. The extension of the shaft 232 relative to the cylinder 231 moves the connector member 220B relative to the coupling member 150 to laterally move the tool 12 to the left as shown in FIGS. 18 and 19. The tool 12 is now capable of cutting vegetation immediately in front of the wheel 32 of the vehicle 12.

Figure 20:
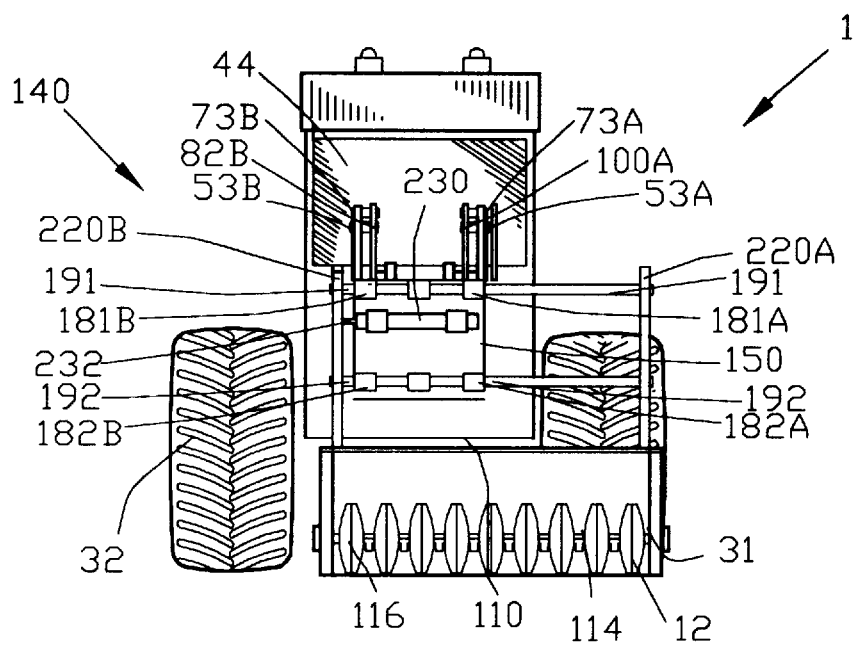
FIG. 20 is a front elevational view of FIG. 9 illustrating the tool in a second lateral position.
Figure 21:
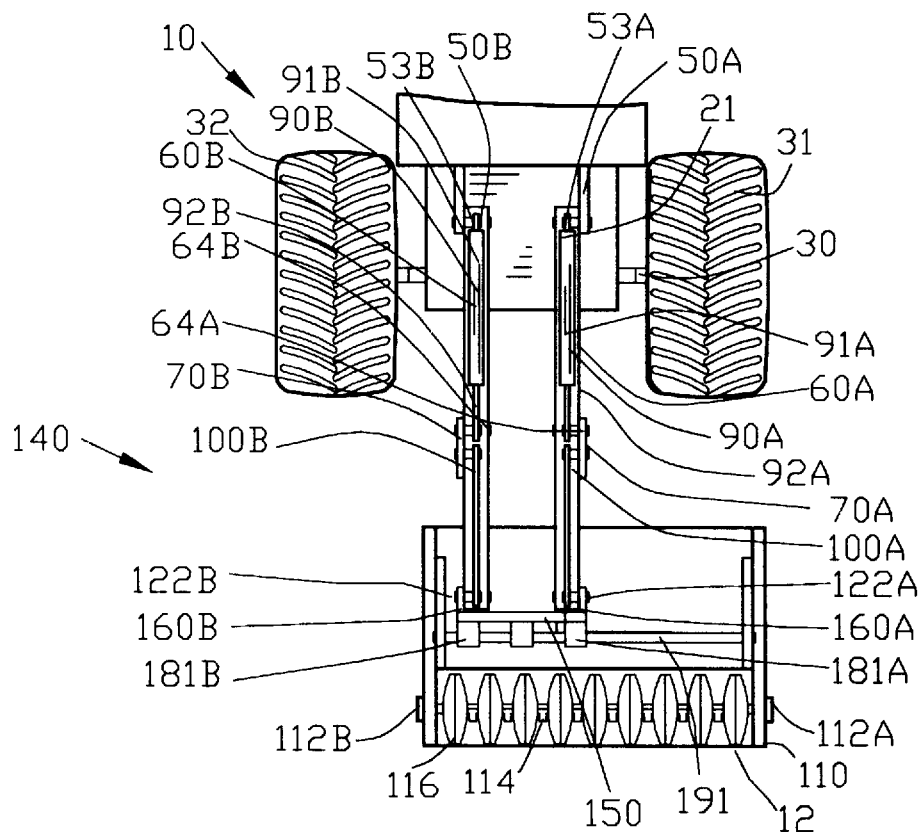
FIG. 21 is a top view of FIG. 20.

FIG. 20 is a front elevational view of FIG. 9 illustrating the tool 12 in a second lateral position with FIG. 21 being a top view of FIG. 20. When it is desired to cut vegetation immediately in front of the wheel 31 of the vehicle 10, the third hydraulic actuator 230 is actuated to retract the shaft 232 relative to the cylinder 231. The retraction of the shaft 232 relative to the cylinder 231 moves the connector member 220B relative to the coupling member 150 to laterally move the tool 12 to the right as shown in FIGS. 18 and 19. The tool 12 is now capable of cutting vegetation immediately in front of the wheel 31 of the vehicle 12.

The present invention provides an improved coupling for coupling a tool to a vehicle for enabling the lateral movement of the tool relative to the vehicle. The invention is capable of laterally moving the tool to be positioned in line with a side of the vehicle. The invention provides an improved coupling which is capable of laterally moving the tool to be positioned in front of a front wheel of the vehicle. The invention may be power operated by hydraulic power and may be fitted to existing vehicles. The invention enables the tool to be readably interchanged with other tools.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved lateral coupling device for coupling a tool to a vehicle, the vehicle having a first arm extending from the vehicle for carrying the tool, and a second arm extending from the vehicle for orienting the position of the tool relative to the first arm, the improved lateral coupling device comprising:

a coupling member having a first and a second pivot for pivotably securing said coupling member to the first and second arms;

a first and a second bearing secured to said coupling member;

a first and a second shaft slidably mounted in said first and second bearings;

a pair of connector members secured in proximity to opposed ends of said first and second shafts for mounting to the tool; and an actuator coacting between said coupling member and said connector member for moving said connector member relative to said coupling member on said first and second shafts for laterally adjusting the position of the tool relative to the vehicle.

2. An improved coupling device as set forth in claim 1, wherein the vehicle is a land vehicle.

3. An improved coupling device as set forth in claim 1, wherein the tool is a powered tool.

4. An improved coupling device as set forth in claim 1, wherein said coupling member comprises a longitudinally extending plate.

5. An improved coupling device as set forth in claim 1, wherein each of said first and second arms comprises a pair of arms.

6. An improved coupling device as set forth in claim 1, wherein said first and second shafts are substantially parallel.

7. An improved lateral coupling device as set forth in claim 1, wherein said actuator drives said connector member in a direction parallel to a longitudinal axis extending through one of said first and second shafts.

8. An improved coupling device as set forth in claim 1, wherein said connector member comprises a pair of connector members secured to opposed ends of said first and second shafts.

9. An improved coupling device as set forth in claim 1, wherein said actuator is secured to said coupling member and coacts with said connector member for moving said connector member on said first and second shafts relative to said coupling member.

10. An improved coupling device as set forth in claim 1, wherein said actuator is a hydraulic actuator; and said hydraulic actuator coacting between said coupling member and said connector member for moving said connector member on said first and second shafts relative to said coupling member.

11. An improved lateral coupling device for coupling a power tool to a land vehicle, the land vehicle having a first pair of arms pivotably extending from the land vehicle for carrying the power tool, and a second pair of arms extending from the land vehicle for orienting the position of the power tool relative to the first pair of arms, the improved lateral coupling device comprising:

a coupling member having a first and a second pair of pivots for pivotably securing said coupling member to the first and second pairs of arms, respectively;

a first and a second pair of bearings secured to said coupling member;

a first and a second shaft slidably mounted in said first and second pair of bearings;

a pair of connector members secured to opposed ends of said first and second shafts for mounting to the power tool; and a hydraulic actuator coacting between said coupling member and said connector member for moving connector member relative to said coupling member on said first and second shafts to laterally adjust the power tool relative to the land vehicle.

12. An improved lateral coupling device as set forth in claim 11, wherein said first and second pair of pivots are secured to a first side of said coupling member; and said first and second pair of bearings being secured to a second side of said coupling member.

13. An improved lateral coupling device as set forth in claim 11, wherein said first and second pair of pivots are secured to a first side of said coupling member;

said first and second pair of bearings being secured to a second side of said coupling member and being respectively located adjacent to said first and second pair of pivots.

14. An improved lateral coupling device as set forth in claim 11, wherein said first and second shafts are substantially parallel.

15. An improved lateral coupling device as set forth in claim 11, wherein said hydraulic actuator moves said connector member in a direction parallel to a longitudinal axis extending through one of said first and second shafts.

16. An improved lateral coupling device as set forth in claim 11, wherein said first and second shafts are substantially parallel and oriented in a generally horizontal orientation; and said hydraulic actuator laterally moving said connector member on said first and second shafts in a generally horizontal direction.

17. An improved lateral coupling device as set forth in claim 11, wherein said hydraulic actuator is secured to said coupling member for coacting between said coupling member and said connector member for moving said connector member on said first and second shafts relative to said coupling member.

18. An improved lateral coupling device as set forth in claim 11, wherein said hydraulic actuator comprises a cylinder and a piston; and said cylinder of said hydraulic actuator being secured to said coupling member with said piston being connected to said connector member for moving said connector member relative to said coupling member on said first and second shafts relative to said coupling member.

* * * * *